United States Patent
Stauffer

(10) Patent No.: US 7,682,737 B2
(45) Date of Patent: Mar. 23, 2010

(54) LEAD-ZINC STORAGE BATTERY

(76) Inventor: John E. Stauffer, 6 Pecksland Rd., Greenwich, CT (US) 06830

( * ) Notice: Subject to any disclaimer, the term of this patent is extended or adjusted under 35 U.S.C. 154(b) by 32 days.

(21) Appl. No.: 11/763,029

(22) Filed: Jun. 14, 2007

(65) Prior Publication Data
US 2007/0238022 A1  Oct. 11, 2007

Related U.S. Application Data

(63) Continuation of application No. 11/249,223, filed on Oct. 13, 2005, which is a continuation of application No. 10/756,015, filed on Jan. 13, 2004, now abandoned.

(51) Int. Cl.
*H01M 6/04* (2006.01)
*H01M 10/26* (2006.01)
(52) U.S. Cl. ...................... 429/202; 429/344
(58) Field of Classification Search ............... None
See application file for complete search history.

(56) References Cited

U.S. PATENT DOCUMENTS

| | | | |
|---|---|---|---|
| 1,955,115 A | 4/1934 | Drumm | |
| 3,833,427 A | 9/1974 | Land et al. | |
| 3,862,861 A | 1/1975 | McClelland et al. | |
| 3,944,435 A | * 3/1976 | Kordesch | 429/206 |
| 4,076,909 A | * 2/1978 | Lindstrom | 429/207 |
| 4,830,718 A | 5/1989 | Stauffer | |
| 5,344,529 A | 9/1994 | Stauffer | |
| 5,512,144 A | 4/1996 | Stauffer | |
| 5,599,637 A | 2/1997 | Pecherer et al. | |
| 5,705,050 A | 1/1998 | Sampson et al. | |
| 6,010,604 A | 1/2000 | Stauffer | |
| 6,235,167 B1 | 5/2001 | Stauffer | |
| 6,391,186 B1 | 5/2002 | Stauffer | |

FOREIGN PATENT DOCUMENTS

JP    56165271 A  * 12/1981

* cited by examiner

*Primary Examiner*—Keith Walker
(74) *Attorney, Agent, or Firm*—Young Basile

(57) ABSTRACT

A storage battery is provided such that in its charged condition the positive electrode comprises lead dioxide and the negative electrode comprises zinc. Upon discharge, the lead dioxide is reduced to lead monoxide and the zinc is oxidized to zinc oxide. The electrolyte comprises an aqueous solution of a chromate salt.

3 Claims, 1 Drawing Sheet

LEAD-ZINC STORAGE BATTERY

RELATED APPLICATIONS

This application is a continuation in part of U.S. application Ser. No. 11/249,223 filed under on Oct. 13, 2005, which in turn is a continuation of U.S. application Ser. No. 10/756,015.

FIELD OF THE INVENTION

The present invention relates to a novel type of storage battery, which is distinguished by its unique electrochemistry. The positive electrode is fabricated from a lead based material; i.e. lead oxide or lead dioxide, and the negative electrode from zinc. The electrolyte consists of an alkaline aqueous solution of a chromate salt, which functions as a buffer. Upon charging the battery, the lead-based material is converted to lead dioxide. When the battery is discharged, lead dioxide is reduced to lead monoxide and zinc is oxidized to zinc oxide.

BACKGROUND

The most common storage battery, found in almost every automotive vehicle, is the lead-acid battery. This battery comprises a lead dioxide positive electrode, a lead metal negative electrode, and sulfuric acid for the electrolyte. An improved design of this battery is disclosed in U.S. Pat. No. 3,862,861.

A number of alternatives to the lead-acid battery have been developed over the years for use in other applications. Two of these alternative batteries employ zinc as the negative electrode and caustic potash as the electrolyte. The positive electrode of one battery is nickel oxide and the other uses silver oxide. (U.S. Pat. No. 1,955,115).

In an effort to combine the best features of the lead-acid battery and the proven alkaline batteries, a lead-zinc battery was developed. Described in a co-pending application, this battery has positive electrode of lead, a negative electrode of zinc, and an alkaline electrolyte. In order to minimize potential corrosion problems, various buffers are incorporated into the electrolyte. These buffering agents include carbonates, borates, silicates, and phosphates.

While effective in achieving the stated purpose, these proposed buffers have serious drawbacks, namely, their limited solubilities. This restriction seriously reduced the capability of the lead-zinc battery by increasing the internal resistance of the battery.

Therefore it is an object of the present invention to provide an improved storage battery that avoids the limitations of the prior art. These and other objects, features and advantages of the invention will be recognized from the following description.

SUMMARY

A rechargeable battery has been developed in which the positive electrode comprises lead dioxide, the negative electrode zinc, and the electrolyte an alkaline solution. Upon discharge, the lead dioxide is reduced to lead monoxide and the zinc is oxidized to zinc oxide. These reactions are reversed when the battery is charged.

The electrolyte may consist of an aqueous solution of a suitable base. These bases include ammonia, tetramethyl ammonium hydroxide, as well as the hydroxides of the alkali metals, namely, lithium, sodium, potassium and cesium.

In order to control the alkalinity of the electrolyte, certain additives have been found to be effective buffers. In this application, chromates are most suitable. These chromates include the lithium, sodium, potassium, and cesium salts.

Other applications of the present invention will become apparent to those skilled in the art when the following description of the best mode contemplated for practicing the invention is read in conjunction with the accompanying drawings.

WRITTEN DESCRIPTION

Figure 1:
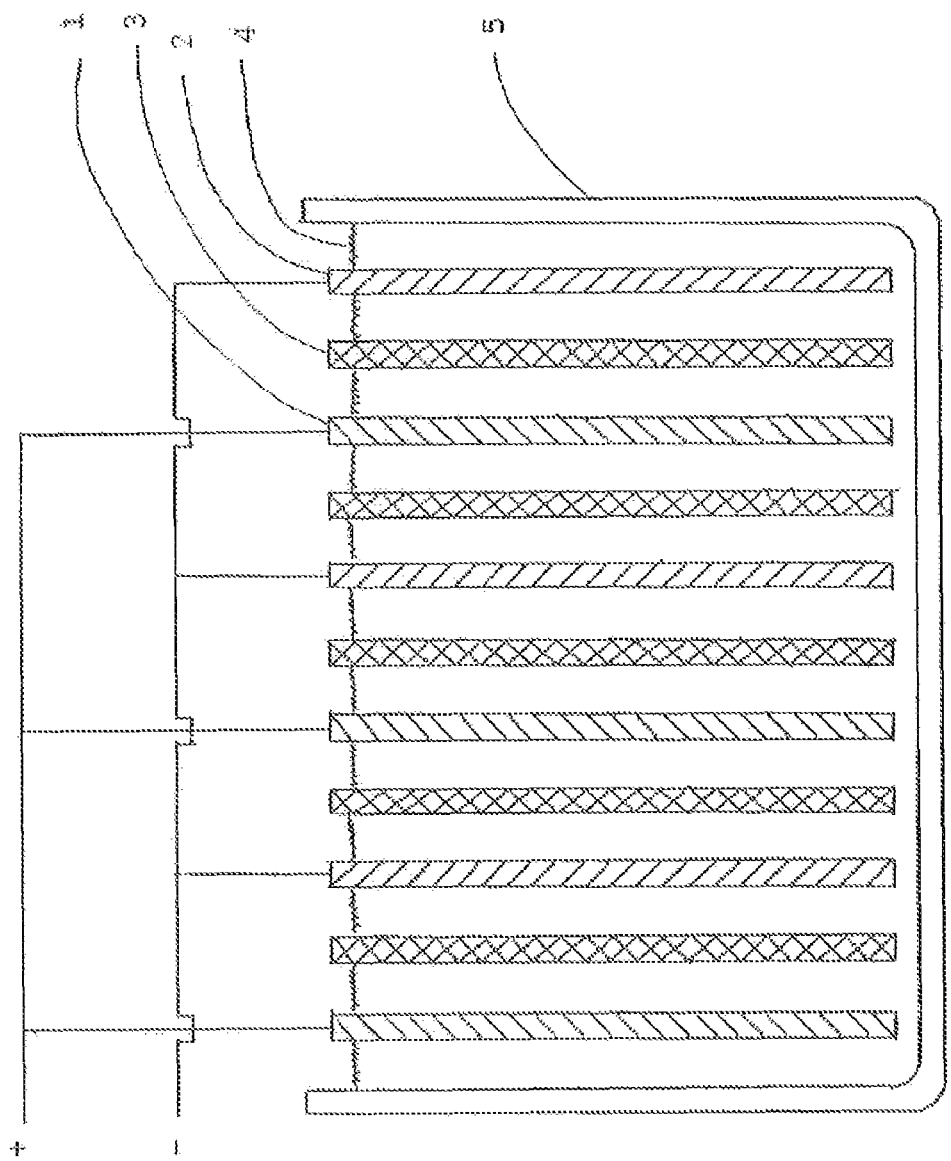
FIG. 1 is a schematic diagram of a battery incorporating the present invention.

The electrochemistry of the lead-zinc battery of the present invention can be shown by the following reactions, which occur during discharge:

$$PbO_2 + H_2O + 2e^- \rightarrow PbO + 2OH^-  \quad (1)$$

And at the negative electrode $$Zn + 2OH^- \rightarrow ZnO + H_2O + 2e^-  \quad (2)$$

Where $PbO_2$ is lead dioxide, $PbO$ is lead monoxide, $Zn$ is zinc metal, $ZnO$ is zinc oxide, $H_2O$ is water, $OH^-$ is the hydroxyl ion, and $e^-$ is an electron.

During recharging of the cell, the above reactions are reversed. The emf that is necessary for charging is supplied by an external power source. The discharge-recharge cycle can be repeated endlessly, thus fulfilling the function of a storage battery.

A particular difficulty in designing a new battery is identifying an electrolyte that contains the proper alkalinity. Experimental work has shown that the electrode materials of the present invention are subject to corrosion in concentrated solutions of alkali hydroxides. On the other hand, weak bases fail to provide the necessary reactivity.

The answer to this dilemma is to use a buffering agent in order to control the pH of the electrolyte as well as to provide high electrical conductivity. Such a buffer has been identified as the chromate salt of an alkali metal. The compound is effective because it is a salt of a weak acid, namely, chromic acid, and a strong base such as sodium hydroxide.

The action of the particular buffer, sodium chromate, can be postulated as follows:

$$2Na_2CrO_4 + H_2O \leftrightarrows Na_2Cr_2O_7 + 2NaOH  \quad (3)$$

Where 2 $Na_2CrO_4$ is sodium chromate, $Na_2Cr_2O_7$ is sodium bichromate, and $NaOH$ is sodium hydroxide.

An important advantage of using chromates as a buffer is their remarkable solubility. Sodium chromate is highly soluble in water, producing a 45.9 percent solution at 25° C. Only slightly less soluble, potassium chromate dissolves, giving a 39.5 percent aqueous solution at 25° C. The significance of these results for an electrolyte cannot be overlooked.

Chromates are unparalleled in providing corrosion protection to nonferrous metals. They function by forming corrosion-resistance films. For example, sodium bichromate will precipitate lead chromate from a solution of soluble lead salts. Similarly, sodium bichromate will protect such metals as copper, brass, magnesium, zinc, cadmium and tin.

Although many battery designs are possible, the simple configuration in FIG. 1 suffices to explain the features of the present invention. Positive electrodes of lead 1 and negative electrodes of zinc 2 are kept from shorting by separators 3. These parts are immersed in alkaline electrolyte 4, which is contained in casing 5. This sectional view also shows the electrical leads attached to the electrodes.

The proposed applications of the storage battery of the present invention are almost limitless. Because of safety considerations and improved performance, initial interest in the battery would be as a replacement for the lead-acid battery. Other uses would most likely follow.

EXAMPLE

A cell was made from a glass jar 2 in. diameter by 4½ in. high. The positive electrode was a sheet of lead 1½ in. wide by 4 in. high. A polypropylene sheet was used as a separator. To prepare the electrolyte, 55.0 gm. Of potassium chromate was dissolved in 150 mil. water. After charging the cell for 5 minutes at 3.5 v., an open circuit potential of 2.55 v. was observed. The cell was repeatedly charged and discharged during the course of the run. At the end of the experiment, the electrodes were in excellent condition and the electrolyte was a clear yellow solution.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A storage battery comprising:
   (a) a positive electrode of a lead-based material
   (b) a negative electrode of zinc; and
   (c) an alkaline electrolyte consisting of an aqueous solution of a chromate salt, wherein the lead-based material is converted to lead dioxide and oxidized zinc is converted to zinc upon charging, and the lead dioxide is reduced and the zinc is oxidized upon discharging.

2. A storage battery of claim 1 in which the chromate salt is sodium chromate.

3. A storage battery of claim 1 in which the chromate salt is potassium chromate.

* * * * *